UNITED STATES PATENT OFFICE.

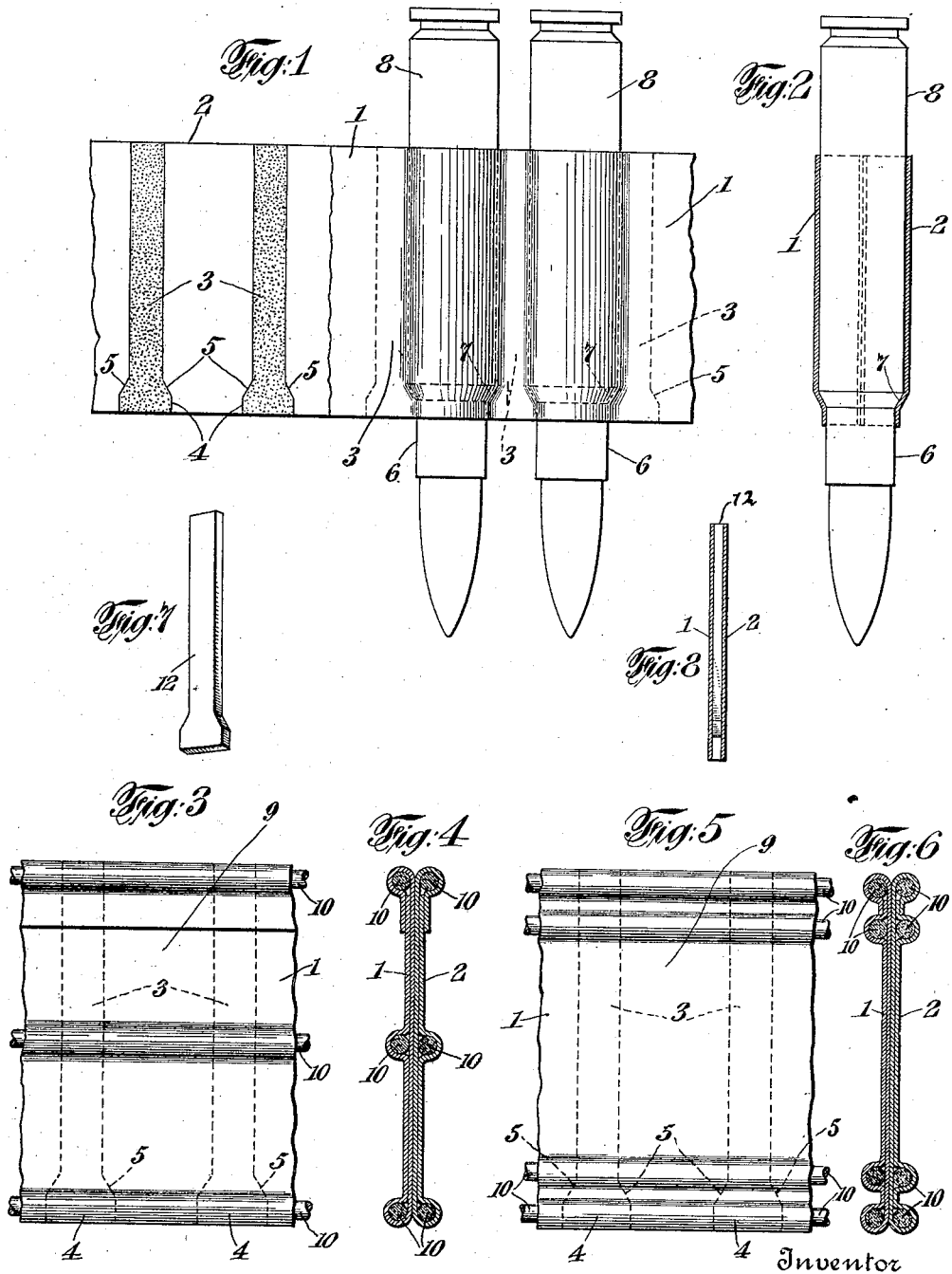

EDWIN B. STIMPSON, OF BROOKLYN, NEW YORK.

CARTRIDGE-BELT.

1,329,346.  Specification of Letters Patent.  Patented Jan. 27, 1920.

Application filed May 24, 1918. Serial No. 236,267.

*To all whom it may concern:*

Be it known that I, EDWIN B. STIMPSON, a citizen of the United States, residing in Brooklyn, county of Kings, and State of New York, have invented a certain new and useful Improvement in Cartridge-Belts, of which the following is a specification.

My invention relates to cartridge feeding belts of the type adapted for use in connection with the operation of machine guns.

In applications Ser. No. 233,553 filed May 9, 1918, and Ser. No. 234,542 filed May 14, 1918, cartridge belts are shown and described as made up of strips of comparatively unsubstantial sheet material, such as paper or light fabric, the strips being held together to form cartridge holding loops by means of stitches or metallic clips or eyelets. The object of the present invention is to provide an effective means for attaching two strips of sheet material of a like nature to each other at spaced apart points to form cartridge holding loops without detracting in any way from the tensile strength of the material.

With this and other objects in view, the principal feature of the invention consists in forming the loops by attaching two strips of material, such as paper, to each other in a face to face relation at suitable intervals by means of glue or other tenacious adhesive material.

Another feature of the invention resides in the placing of suitable spacing members between the strips and in attaching the strips to opposite sides of the spacing members to form the cartridge holding loops.

A cartridge belt thus formed is simple and inexpensive in construction and possesses a sufficiently high degree of strength and durability to serve the purpose for which it is made. Obviously an enormous saving in the weight and volume of material employed is effected by the substitution of paper or other light and unsubstantial material for the comparatively thick webbing heretofore used in the art.

In the drawings,

Figure 1 is a face view, partly broken away, of a section of belt embodying the invention, and showing the manner in which adhesive material is applied to the layers to form cartridge holding loops.

Fig. 2 is a transverse sectional view of the belt shown in Fig. 1.

Fig. 3 is a face view of a modified form of belt, showing the use of strips of sheet material having three reinforcing cords embedded therein.

Fig. 4 is a sectional view of the form of belt shown in Fig. 3.

Fig. 5 is a face view of still another form of the invention showing a different number and arrangement of reinforcing cords therein than is shown in Fig. 3.

Fig. 6 is a sectional view of the form of belt shown in Fig. 5.

Fig. 7 is a perspective view of a spacing member that may be employed between the strips.

Fig. 8 is a sectional view of the belt strip showing the spacing member in place therebetween.

The cartridge belt shown in Fig. 1 comprises the two cartridge-engaging strips of material 1 and 2 which are secured to each other by the application to one of the strips of a coating of adhesive material 3 and then in pressing the remaining strip into contact with the freshly prepared surface of the first strip. In order to form cartridge holding loops, the adhesive material is applied to the strips at spaced apart points, as will be seen, and in areas extending across the entire width of the strip in the preferred embodiments of the invention. It will also be seen that the adhesive is so distributed that at one edge of the strip the coated portions occupy correspondingly wider areas, as at 4, than along the opposite edge, in order to thereby provide loop portions of reduced size to accord with the reduced diameter 6 of the cartridge at the bullet-holding end thereof. The shoulders 5 formed by the gradual expansion of the coated strips 3 into the enlarged end portions 4 preferably take the same angular inclination as that of the shoulders 7 on the cartridges 8.

In the preferred form of the invention shown in Fig. 1 the strip members 1 and 2 are formed of single thicknesses of material such as paper of a tough and tear-resisting nature that renders it well adapted to bear the strain incident upon its employment for this purpose. The use of an adhesive instead of employing metallic fasteners or stitching the parts together with thread, to form the cartridge holding loops 9, leaves the strips wholly unpunctured and unimpaired in any way, so that their entire strength is available for securing a belt construction having the requisite tensile strength. The adhesive material employed preferably not only possesses tenacious holding qualities, but also a considerable degree of flexibility, so that it will withstand the manipulations to which the belts are subjected in operation.

While the preferred embodiment of the invention is that shown in Fig. 1, in which but two single thicknesses of material are made use of in forming a complete belt, I contemplate also the making use of comparatively thin and unsubstantial material such as a light grade of paper in which the requisite tensile strength is secured by the use of reinforcing cords, as in the inventions already referred to. In the embodiment shown in Figs. 3 and 4 such a construction is shown in which the main strip members 1 and 2 forming the belt are made up of thin strips folded over on themselves and including between the respective folds three reinforcing cords 10 arranged one along each edge and one along the central portion of the belt in the manner indicated. The folds are preferably securely held together and the cords held in place therein by means of a suitable adhesive.

The adhesive coated portions 3 are arranged in much the same manner that they are arranged in Fig. 1, that is, they are expanded at 4 to form correspondingly restricted loop portions adapted to fit the reduced diameter of the bullet-holding end of the cartridge. In Figs. 5 and 6 there is shown a construction very similar to that shown in Figs. 3 and 4, except that four reinforcing cords 10 are made use of and distributed in pairs along the opposite lateral edges of the strips. This provides a very efficient construction and one that will withstand the strain of vigorous use. While reference has been made to the use of paper as the preferred material, it is obvious that textile or other materials could also be employed if desired, and that thin and comparatively unsubstantial materials could thus be made use of in lieu of the heavy webbing heretofore employed. It is also obvious that the areas to which the adhesive is applied need not necessarily extend entirely across the strips, but that in certain circumstances adhesive applied adjacent to the opposite edges and leaving the central portion free would be sufficient. While in the various modifications the belt has been shown as made up of separate layers united by means of an adhesive, it is obvious that a single strip of material may be folded laterally upon itself to form the belt, in which case openings might be provided for the cartridges along the folded edge or the cartridges may be forced through the folded edge by utilizing the pointed bullets for the purpose.

In order to reduce to some extent the sharpness of the angle at which the loop portions of the belt are bent out of their position in contact with each other at the gummed portions 3, I contemplate the use of strip spacing members 12 such as is shown in Fig. 7 of the drawing. These spacing members are preferably given the same general formation as the glued portions 3 of the strip 2 in Fig. 1 and possess a substantial thickness for the purpose referred to. They are preferably attached to the strip at the proper intervals to form intervening cartridge holding loops by applying adhesive to both opposite faces of the spacing members and then in attaching the strips to the corresponding sides thereof. This forms a very efficient construction and a sectional view of the strips 1 and 2 with the interposed spacing member 12 is shown in Fig. 8 of the drawing.

Having thus described my invention, what I claim and desire to secure by Letters Patent of the United States is:

1. A cartridge belt comprising: layers of longitudinally reinforced paper placed in face to face relation, and spacing members inserted between said layers at intervals to form cartridge holding loops, said layers being attached to opposite sides of said spacing members.

2. A cartridge belt comprising: layers of longitudinally reinforced paper placed in face to face relation, spacing members inserted between said layers at intervals to form cartridge holding loops, said layers being attached to opposite sides of said spacing members by means of an adhesive.

Signed at Brooklyn, in the county of Kings, and State of New York, this 21st day of May, 1918.

EDWIN B. STIMPSON.